United States Patent
Shukla et al.

(10) Patent No.: US 8,958,429 B2
(45) Date of Patent: Feb. 17, 2015

(54) METHODS AND APPARATUS FOR REDUNDANCY ASSOCIATED WITH A FIBRE CHANNEL OVER ETHERNET NETWORK

(75) Inventors: Amit Shukla, Sunnyvale, CA (US); Suresh Boddapati, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 399 days.

(21) Appl. No.: 12/976,096

(22) Filed: Dec. 22, 2010

(65) Prior Publication Data
US 2012/0163391 A1 Jun. 28, 2012

(51) Int. Cl.
| | |
|---|---|
| H04L 12/56 | (2006.01) |
| H04L 12/28 | (2006.01) |
| H04L 12/707 | (2013.01) |
| H04L 12/939 | (2013.01) |
| H04L 12/703 | (2013.01) |
| H04L 12/931 | (2013.01) |
| H04L 12/10 | (2006.01) |
| H04L 12/12 | (2006.01) |

(52) U.S. Cl.
CPC .............. *H04L 45/24* (2013.01); *H04L 49/557* (2013.01); *H04L 49/55* (2013.01); *H04L 45/28* (2013.01); *H04L 49/357* (2013.01); *H04L 49/552* (2013.01); *H04L 49/70* (2013.01); *Y02B 60/35* (2013.01); *Y02B 60/34* (2013.01); *H04L 12/10* (2013.01); *H04L 12/12* (2013.01)
USPC ........... 370/401; 370/216; 370/217; 370/218; 370/225; 370/228; 714/100; 714/1; 714/2; 714/48; 714/56

(58) Field of Classification Search
None
See application file for complete search history.

(56) References Cited

U.S. PATENT DOCUMENTS

| | | | |
|---|---|---|---|
| 6,625,673 B1 | 9/2003 | Dickey et al. | |
| 6,741,559 B1 * | 5/2004 | Smeulders et al. | 370/230 |
| 6,950,871 B1 | 9/2005 | Honma et al. | |
| 7,447,149 B1 * | 11/2008 | Beesley et al. | 370/217 |
| 7,451,208 B1 * | 11/2008 | Bakke et al. | 709/224 |
| 7,774,445 B1 | 8/2010 | Weinbrecht et al. | |
| 7,778,157 B1 * | 8/2010 | Tawri et al. | 370/216 |
| 7,881,188 B2 * | 2/2011 | Li et al. | 370/217 |
| 7,889,674 B2 | 2/2011 | Park et al. | |

(Continued)

OTHER PUBLICATIONS

Wikipedia, Classless Inter-Domain Routing, [Online] [retrieved Sep. 8, 2010] Retrieved from the Internet: <URL: http://en.wikipedia.org/wiki/Classless Inter-Domain Routing> (3 pages), Modified: Sep. 2010.

(Continued)

*Primary Examiner* — Ayaz Sheikh
*Assistant Examiner* — Peter Chau
(74) *Attorney, Agent, or Firm* — Cooley LLP

(57) ABSTRACT

In some embodiments, an apparatus includes a gateway device configured to be operatively coupled to a Fiber Channel switch by a first data port and a second data port. The gateway device is configured to designate the first data port as a primary data port and the second data port as a secondary data port. The gateway device is configured to associate a set of virtual ports with the first data port and not the second data port when in the first configuration. The gateway device is configured to associate the set of virtual ports with the second data port when in the second configuration. The gateway device moves from the first configuration to the second configuration when an error associated with the first data port is detected.

17 Claims, 6 Drawing Sheets

(56) References Cited

U.S. PATENT DOCUMENTS

| | | |
|---|---|---|
| 2002/0196773 A1 | 12/2002 | Berman |
| 2003/0179748 A1 | 9/2003 | George et al. |
| 2003/0195956 A1 | 10/2003 | Bramhall et al. |
| 2005/0091353 A1 | 4/2005 | Gopisetty et al. |
| 2006/0075480 A1 | 4/2006 | Noehring et al. |
| 2006/0095965 A1 | 5/2006 | Phillips et al. |
| 2006/0190611 A1 | 8/2006 | Miyazaki et al. |
| 2007/0143395 A1 | 6/2007 | Uehara et al. |
| 2008/0247405 A1 | 10/2008 | O'Leary et al. |
| 2008/0282335 A1 | 11/2008 | Abzarian et al. |
| 2009/0025007 A1* | 1/2009 | Hara et al. ............... 718/105 |
| 2009/0157984 A1* | 6/2009 | Hara et al. ............... 711/154 |
| 2009/0164630 A1 | 6/2009 | Hirata et al. |
| 2009/0276526 A1 | 11/2009 | Carlson et al. |
| 2009/0287898 A1* | 11/2009 | Hara ........................ 711/170 |
| 2010/0061383 A1* | 3/2010 | Rupanagunta et al. ...... 370/401 |
| 2010/0115132 A1* | 5/2010 | Hirata et al. ............. 709/245 |
| 2010/0122051 A1* | 5/2010 | Maki et al. ............... 711/162 |
| 2010/0214950 A1* | 8/2010 | Vobbilisetty .............. 370/254 |
| 2011/0029973 A1* | 2/2011 | Hara et al. .................... 718/1 |
| 2011/0051733 A1* | 3/2011 | Hirata ....................... 370/400 |
| 2011/0176412 A1* | 7/2011 | Stine et al. ................ 370/221 |
| 2011/0228670 A1* | 9/2011 | Sasso et al. ............... 370/221 |
| 2012/0163174 A1 | 6/2012 | Shukla et al. |
| 2012/0163374 A1 | 6/2012 | Shah et al. |
| 2012/0163376 A1 | 6/2012 | Shukla et al. |
| 2012/0163395 A1 | 6/2012 | Shukla et al. |

OTHER PUBLICATIONS

Juniper Networks, "Firewall Filters for EX Series Switches Overview" [Online] Retrieved from the Internet: <URL: http://www.juniper.net/techpubs/en_US/junos10.3/topics/concept/fir . . . >, published Jun. 22, 2010 (1 page).

Charlie Schluting, "Storage Basics: Understanding Fibre Channel Zones" [Online] Retrieved from the Internet: <URL: http://www.enterprisestorageforum.com/sans/features/article.php/3710231/Storage-Basics-Understanding-Fibre-Channel-Zones.htm>, Nov. 9, 2007, (2 pages).

Wikipedia, "Fibre Channel zoning" [Online] [retrieved Mar. 14, 2012] Retrieved from the Internet: <URL: http://en.wikipedia.org/wiki/Fibre_Channel_zoning> (2 pages), Updated: Oct. 2011.

Storage Networking Industry Association, "Managing a Fibre Channel Storage Area Network" Storage Network Management Working Group for Fibre Channel (SNMWG-FC) Nov. 20, 1998 (12 pages).

Cisco Systems, Inc. "Zone-Based Policy Firewall Design and Application Guide" Document ID: 98628, Updated: Sep. 13, 2007 (49 pages).

Kireeti Kompella et al. "LSP Hierarchy with Generalized MPLS TE" Juniper Networks, Network Working Group, Internet Draft, draft-ietf-mpls-lsp-hierarchy-08.txt, Mar. 2002 (13 pages).

Brass Tacks, "PT2PT and VN2VN—Directly connecting an FCoE initiator to an FCoE target (Part 1—Overview)" [Online] Retrieved from the Internet: <URL: http://www.brasstacksblog.typepad.com/brass-tacks/2011/03/pt2pt-and-v . . . >, posted Mar. 8, 2011 (5 pages).

John L. Hufferd et al. "The Missing Piece (FCoE Data Transfer End to End with FCF assistance)" T11/10-339v1, Aug. 4, 2010 (15 pages).

Claudio DeSanti et al. Locally Unique N_Port_IDs, T11/10-019v2, Jan. 2010 (12 pages).

Claudio DeSanti et al. "VN2VN Multi-Point and Point-to-Point" T11/10-156v0, Mar. 2010 (32 pages).

U.S. Appl. No. 12/976,085, filed Dec. 22, 2010, entitled Methods and Apparatus to Generate and Update Fibre Channel Firewall Filter Rules Using Address Prefixes.

Office Action for U.S. Appl. No. 12/976,085, mailed Dec. 8, 2011.

Final Office Action for U.S. Appl. No. 12/976,085, mailed Jun. 7, 2012.

U.S. Appl. No. 12/976,105, filed Dec. 22, 2010, entitled Methods and Apparatus to Generate and Update Firewall Filter Rules.

Office Action for U.S. Appl. No. 12/976,105, mailed Dec. 21, 2011.

Final Office Action for U.S. Appl. No. 12/976,105, mailed Jul. 19, 2012.

Office Action for U.S. Appl. No. 12/976,105, mailed Oct. 16, 2012.

U.S. Appl. No. 13/324,424, filed Dec. 13, 2011, entitled Methods and Apparatus for Implementing a Fibre Channel Zone Policy.

* cited by examiner

600

```
┌─────────────────────────────────────────────────────────┐
│ Send a fabric login signal associated with a first port of a │
│ gateway device to a Fibre Channel switch prior to a first time │
│ period.  The first port is associated with a set of virtual ports. │
│                           602                           │
└─────────────────────────────────────────────────────────┘
                              │
                              ▼
┌─────────────────────────────────────────────────────────┐
│ Receive, prior to the first time period, from the Fibre Channel │
│ switch an identifier associated with the first port in response to │
│              the fabric login signal.                   │
│                           604                           │
└─────────────────────────────────────────────────────────┘
                              │
                              ▼
┌─────────────────────────────────────────────────────────┐
│ Send, during the first time period, data packets addressed using │
│    the identifier to the Fibre Channel switch via the first port. │
│                           606                           │
└─────────────────────────────────────────────────────────┘
                              │
                              ▼
┌─────────────────────────────────────────────────────────┐
│ Associate, before a second time period, after the first time │
│ period, and in response to an error at the first port, the set of │
│           virtual ports with a second port.             │
│                           608                           │
└─────────────────────────────────────────────────────────┘
                              │
                              ▼
┌─────────────────────────────────────────────────────────┐
│ Associate, before the second time period, the identifier with the │
│                      second port.                       │
│                           610                           │
└─────────────────────────────────────────────────────────┘
                              │
                              ▼
┌─────────────────────────────────────────────────────────┐
│ Send, during the second time period, data packets addressed │
│ using the identifier to the Fibre Channel switch via the second │
│                           port.                         │
│                           612                           │
└─────────────────────────────────────────────────────────┘
```

FIG. 7

METHODS AND APPARATUS FOR REDUNDANCY ASSOCIATED WITH A FIBRE CHANNEL OVER ETHERNET NETWORK

BACKGROUND

Embodiments described herein relate generally to port redundancy, and, in particular, to port redundancy at a Fibre Channel over Ethernet (FCoE) gateway device.

Some known FCoE to Fibre Channel gateway devices can associate one or more virtual ports with a single physical port to send data to a Fibre Channel switch. In such embodiments, if an error is detected at the single physical port, the virtual ports associated with that single physical port are no longer able to send data to the Fibre Channel switch. Additionally, each virtual port performs a subsequent login to the Fibre Channel switch after the error at the physical port is repaired. Such a subsequent login can further increase the time the virtual ports are unable to send data to the Fibre Channel switch.

Accordingly, a need exists for methods and apparatus that provide redundancy for the virtual ports of a FCoE to Fibre Channel gateway device.

SUMMARY

In some embodiments, an apparatus includes a gateway device configured to be operatively coupled to a Fibre Channel switch by a first data port and a second data port. The gateway device is configured to designate the first data port as a primary data port and the second data port as a secondary data port. The gateway device is configured to associate a set of virtual ports with the first data port and not the second data port when in the first configuration. The gateway device is configured to associate the set of virtual ports with the second data port when in the second configuration. The gateway device moves from the first configuration to the second configuration when an error associated with the first data port is detected.

BRIEF DESCRIPTION OF THE DRAWINGS

FIG. 7 is a flow chart illustrating a method of associating a set of virtual ports with a secondary port upon failure of a primary port, according to another embodiment.

DETAILED DESCRIPTION

Figure 1:
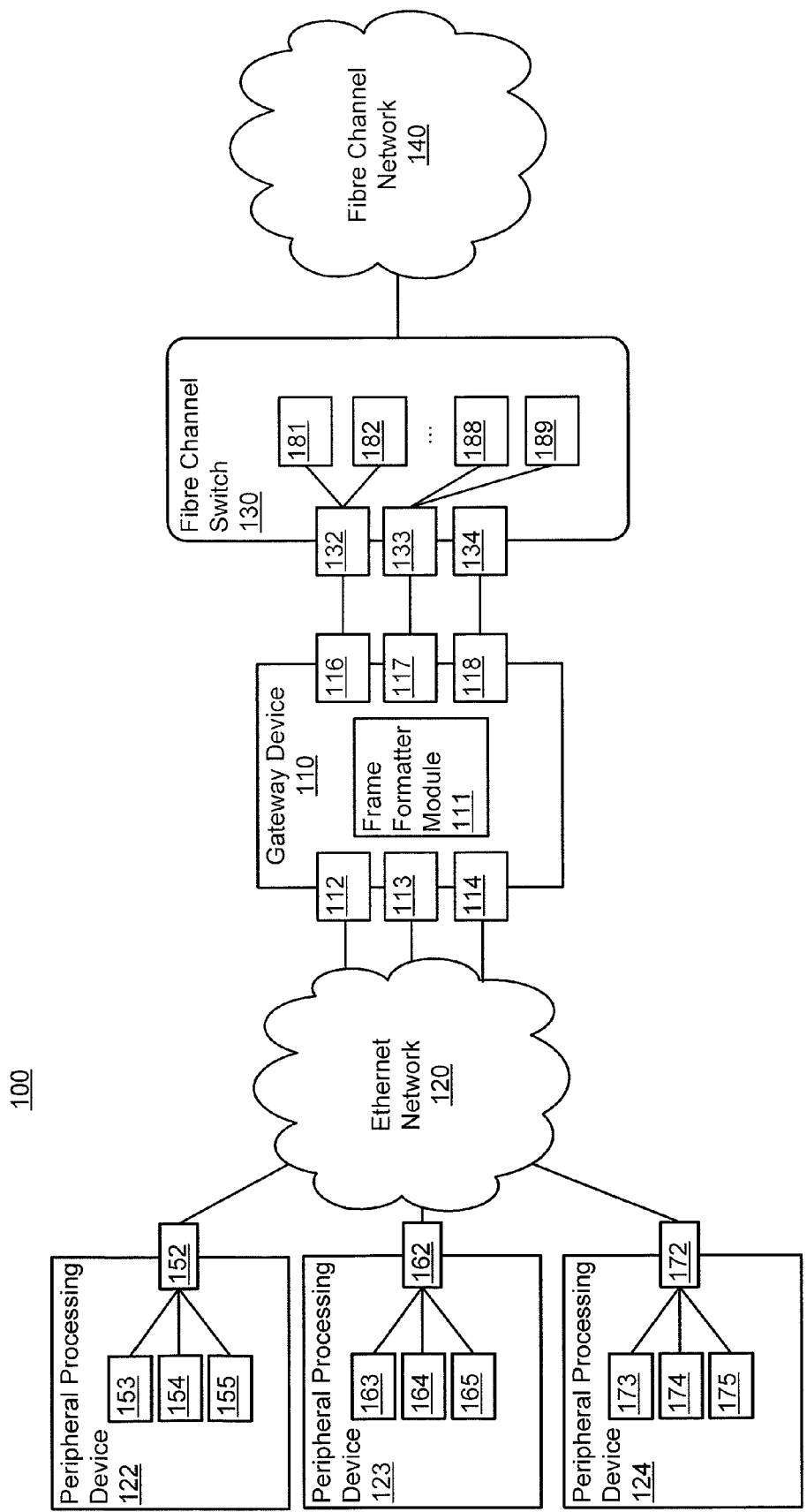
FIG. 1 is a schematic illustration of a mixed Ethernet and Fibre Channel portion of a computer network, according to an embodiment.

In some embodiments, an apparatus includes a gateway device configured to be operatively coupled to a Fibre Channel switch by a first data port and a second data port. The gateway device is configured to designate the first data port as a primary data port and the second data port as a secondary data port. The gateway device is configured to associate a set of virtual ports with the first data port and not the second data port when in the first configuration. The gateway device is configured to associate the set of virtual ports with the second data port when in the second configuration. The gateway device moves from the first configuration to the second configuration when an error associated with the first data port is detected.

In such an embodiment, the secondary data ports can function as backup ports for the primary data ports. Accordingly, the virtual ports sending data via a primary data port when the gateway device is in the first configuration can be associated with and can send data via a secondary data port when the gateway device is in the second configuration. In some embodiments, the secondary data port logs into the Fibre Channel switch prior to the error being detected. In such embodiments, the virtual ports need not log into the Fibre Channel switch prior to sending data to the Fibre Channel switch via the secondary port. In such embodiments, the gateway device and/or the Fibre Channel switch can associate identifiers of the virtual ports with the secondary data port.

In some embodiments, a non-transitory processor-readable medium stores code that represents instructions to cause the processor to send a fabric login signal associated with a first port of a gateway device to a Fibre Channel switch prior to a first time period. The first port is associated with a set of virtual ports. The fabric login signal has an indication that the first port is a primary port. The non-transitory processor-readable medium stores code that represents instructions to cause the processor to receive, prior to the first time period, from the Fibre Channel switch an identifier associated with the first port in response to the fabric login signal and to send, during the first time period, data packets addressed using the identifier to the Fibre Channel switch via the first port. The non-transitory processor-readable medium further stores code that represents instructions to cause the processor to associate, before a second time period, after the first time period, and in response to an error at the first port, the set of virtual ports with a second port, and to associate, before the second time period, the identifier with the second port. The non-transitory processor-readable medium further stores code that represents instructions to cause the processor to send, during the second time period, data packets addressed using the identifier to the Fibre Channel switch via the second port.

In some embodiments, an apparatus includes a gateway device configured to be operatively coupled to a Fibre Channel switch by a set of primary data ports and a secondary data port. The gateway device is configured to receive, from the Fibre Channel switch, an identifier for each primary data port from the set of primary data ports. The gateway device is configured to associate a virtual port from a set of virtual ports with each primary data port from the set of primary data ports but not the secondary data port when the gateway device is in a first configuration. The gateway device is configured to associate the virtual port associated with a primary data port from the set of primary data ports in the first configuration with the secondary data port when the gateway device is in a second configuration. The gateway device is configured to associate the identifier for the primary data port from the set of primary data ports with the secondary data port when the gateway device is in the second configuration. The gateway device moves from the first configuration to the second configuration when an error associated with the primary data port from the set of primary data ports is detected.

As used in this specification, the singular forms "a," "an" and "the" include plural referents unless the context clearly dictates otherwise. Thus, for example, the term "a virtual port" is intended to mean a single virtual port or a combination and/or group of virtual ports.

FIG. 1 is a schematic illustration of a mixed Ethernet and Fibre Channel portion of a computer network, according to an embodiment. More specifically, FIG. 1 illustrates a Network Portion 100 that includes a Gateway Device 110 physically and/or operatively coupled to Peripheral Processing Devices 122-124 (via an Ethernet Network 120 and Ethernet Ports 112-114) and a Fibre Channel Switch 130 (via Fibre Channel Ports 116-118). The Fibre Channel Switch 130 is operatively and/or physically coupled to the Gateway Device 110 via the Fibre Channel Ports 132-134, and to a Fibre Channel Network 140. The Fibre Channel Switch 130 includes a set of Virtual Fibre Channel F Ports 181-189, and each of the Fibre Channel ports 132-134 is operatively coupled to at least one of the Virtual Fibre Channel F Ports 181-189. The Peripheral Processing Devices 122-124 are operatively and/or physically coupled to the Gateway Device 110 via the FCoE Ports 152, 162 and 172, respectively, and the Ethernet Network 120. The FCoE Ports 152, 162 and 172 are operatively coupled to the Virtual Fibre Channel N Ports 153-155, 163-165 and 173-175, respectively. Each of the Virtual Fibre Channel N Ports 153-155, 163-165 and 173-175 is uniquely and operatively associated with one of the Virtual Fibre Channel F Ports 181-189 instantiated at the Fibre Channel Switch 130.

The Network Portion 100 can be a combination of hardware and/or software (executing on hardware) configured to transmit data between any of the Peripheral Processing Devices 122-124 and the Fibre Channel Network 140 via the Ethernet Network 120, the Gateway Device 110 and the Fibre Channel Switch 130. The Network Portion 100 can be, for example, a portion of a data center fabric, local area network (LAN), wide area network (WAN), storage area network (SAN), intranet, and/or the Internet.

The Gateway Device 110 can be, for example, an FCoE gateway. In some embodiments, the Gateway Device 110 can be configured to transmit data based at least in part on Ethernet, Fibre Channel and/or FCoE network protocols via the Ethernet Ports 112-114 and/or the Fibre Channel Ports 116-118. In such embodiments, the Ethernet Ports 112-114 can be configured to send FCoE frames to and/or receive FCoE frames from any of the FCoE Ports 152, 162 and 172 via the Ethernet Network 120. In such embodiments, the Fibre Channel Ports 116-118 can be Fibre Channel ports configured to send Fibre Channel frames to and/or receive Fibre Channel frames from the Fibre Channel Switch 130. As shown in FIG. 1, the Gateway Device 110 also includes a Frame Formatter Module 111 configured to format received FCoE, Ethernet and/or Fibre Channel frames for transmission to a network device or switch.

In some embodiments, each Fibre Channel Port 116-118 can be associated with one or more virtual ports (not shown in FIG. 1) at the gateway device 110 that are associated with and/or correspond to the virtual ports 181-189 of the Fibre Channel Switch 130 (described in further detail herein). For example, a virtual port associated with the Fibre Channel Port 116 can be configured to send data to and receive data from the virtual port 181 (associated with the Fibre Channel Port 132) of the Fibre Channel Switch 130, while a virtual port associated with the Fibre Channel Port 117 can be configured to send data to and receive data from the virtual port 188 (associated with the Fibre Channel Port 133) of the Fibre Channel Switch 130. Accordingly, in some embodiments, data traffic to be sent to and/or data traffic received from a specific virtual port 181-189 of the Fibre Channel Switch 130 can be sent via and/or received at a specific Fibre Channel Port 116-118 associated with that virtual port 181-189.

Additionally, each virtual port associated with the Fibre Channel Ports 116-118 can be associated with and/or correspond to a virtual port 153-155, 163-165, 173-175 of the Peripheral Processing Devices 122-124. For example, a virtual port associated with the Fibre Channel Port 116 can be configured to send data to and/or receive data from the virtual port 153 and a virtual port associated with the Fibre Channel Port 117 can be configured to send data to and receive data from the virtual port 163. Thus, via the virtual ports at the gateway device 110 and associated with the Fibre Channel Ports 116-118, a data path can be defined between a virtual port 153-155, 163-165, 173-175 (e.g., a virtual Fibre Channel N port) and a virtual port 181-189 (e.g., a virtual Fibre Channel F port).

In some embodiments and as described in further detail herein, the Fibre Channel Ports 116-118 can be designated as either primary ports or secondary ports. For example, the Fibre Channel Ports 116 and 117 can be designated as primary ports and the Fibre Channel Port 118 can be designated as a secondary port. In such an example, if an error is detected at either Fibre Channel Port 116 or Fibre Channel Port 117 (i.e., the primary ports), the data traffic to be sent on the primary Fibre Channel Port 116 or 117 having an error can be sent via the secondary Fibre Channel Port 118. More specifically and as described in further detail herein, the gateway device 110 can associate the virtual ports (not shown in FIG. 1) that were associated with the primary Fibre Channel Port 116 or 117 prior to the error being detected, with the secondary Fibre Channel Port 118. This provides redundancy for the Fibre Channel Ports 116 and 117.

In some embodiments, each of the Ethernet Ports 112-114 can be a physical Ethernet port configured to exchange data with any of the Peripheral Processing Devices 122-124 via the Ethernet Network 120 and the FCoE Ports 152, 162 and 172, respectively. Although not shown in FIG. 1, in some embodiments, each of the Ethernet Ports 112-114 can be physically coupled to one of multiple Ethernet Network Interface Cards (NICs) included in the Gateway Device 110.

As shown in FIG. 1, each of the Fibre Channel Ports 116-118 is uniquely coupled to one of the Fibre Channel Ports 132-134 of the Fibre Channel Switch 130. In some embodiments, each of the Fibre Channel Ports 116-118 can be a physical Fibre Channel port configured to allow exchange of one or more Fibre Channel frames between the Gateway Device 110 and the Fibre Channel Switch 130.

In some embodiments, the Frame Formatter Module 111 can be any hardware-based module and/or software-based module (executing in hardware) configured to (1) encapsulate received Fibre Channel frames within FCoE frames for transmission via the Ethernet Network 120 and/or (2) extract Fibre Channel frames from received FCoE frames for transmission to the Fibre Channel Switch 130. In some embodiments, the Frame Formatter Module 111 can be and/or can function similar to a CNA.

Although not shown in FIG. 1, the Gateway Device 110 can include one or more data structures indicating one or more switching policies, rules and/or filters. For example, in some embodiments the Gateway Device 110 can include and/or be operatively coupled to a switching table and/or filter database (not shown in FIG. 1) used by the Gateway Device 110 when switching data frames to one or more of the Peripheral Processing Devices 122-124 and/or the Fibre Channel Switch 130. Accordingly, the Gateway Device 110 can serve as a gateway between the Peripheral Processing Devices 122-124 and the Fibre Channel Switch 130, allowing for the transmission of FCoE frames from the Peripheral Processing Devices 122-124 to the Fibre Channel Switch 130, and for the transmission of Fibre Channel frames from the Fibre Channel Switch 130 to any of the Peripheral Processing Devices 122-124.

In some embodiments, the Gateway Device 110 can be physically located within the same physical chassis as the Fibre Channel Switch 130. In some embodiments, the Gateway Device 110 can function as both an FCoE gateway and a Fibre Channel switching device. Alternatively, as shown in FIG. 1, the Gateway Device 110 and the Fibre Channel Switch can be located within different chasses.

The Ethernet Network 120 can be any combination of network hardware devices and/or software modules (executing in hardware) that together comprise an Ethernet network. The Ethernet Network 120 can include, for example, one or more Ethernet-compatible switches, routers, peripheral devices, servers, line cards and/or network interface cards (NICs). In some embodiments, the Ethernet Network 120 can include one or more devices and/or modules physically and/or operatively coupled via cable (such as Category 5 cable) and/or one or more wireless connections. In other embodiments, the peripheral processing devices 122-124 are directly coupled to the gateway device 110 (i.e., without any intervening devices and/or modules).

As shown in FIG. 1, the Ethernet Network 120 is operatively and/or physically coupled to each of the Peripheral Processing Devices 122-124 via the FCoE Ports 152, 162 and 172, respectively. Although not shown in FIG. 1, in some embodiments, any or all of the Peripheral Processing Devices 122-124 can be included in the Ethernet Network 120. In some embodiments, the Ethernet Network 120 can transmit one or more FCoE frames to one or more of the Peripheral Processing Devices 122-124. The one or more FCoE frames (not shown in FIG. 1) can include encapsulated Fibre Channel frames originally sent from the Fibre Channel Network 140 and/or the Fibre Channel Switch 130. Additionally, the Ethernet Network 120 can optionally receive one or more FCoE and/or Ethernet frames from any of the Peripheral Processing Devices 122-124 for transmission to the Fibre Channel Switch 130 and/or the Fibre Channel Network 140 via the Gateway Device 110.

Each of the Peripheral Processing Devices 122-124 can be any combination of hardware and/or software (executing in hardware) capable of transmitting information to and/or receiving information from the Gateway Device 110 via the Ethernet Network 120. In some embodiments, one or more of the Peripheral Processing Devices 122-124 can be a server device, an application server, a database system, a storage device, a gateway, workstation, a compute device and/or the like. Each of the Peripheral Processing Devices 122-124 can optionally be, for example, compute nodes, service nodes, routers, and/or storage nodes. In some embodiments, one or more of the Peripheral Processing Devices 122-124 can perform one or more computing tasks, such as one or more data storage, software-as-a-service (SAS), web service, content request, or other computing tasks. In some embodiments, one or more of the Peripheral Processing Devices 122-124 can be a Fibre Channel-based device operatively and/or physically coupled to one or more other Fibre Channel-based devices, such as a Fibre Channel switch, a Fibre Channel fabric, a SAN, etc.

As shown in FIG. 1, the Peripheral Processing Devices 122-124 can include the FCoE Ports 152, 162 and 172, respectively, and the Virtual Fibre Channel N Ports 153-155, 163-165 and 173-175, respectively. In some embodiments, each of the Virtual Fibre Channel N Ports 153-155, 163-165 and 173-175 can be configured to send one or more Fibre Channel frames for encapsulation within an FCoE frame and subsequent transmission by the corresponding FCoE port from the FCoE Ports 152, 162 and 172. The appropriate FCoE port from the FCoE Ports 152, 162 and 172 can transmit the FCoE frame to the Gateway Device 110 via the Ethernet Network 120. Each of the Virtual Fibre Channel N Ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE Ports 152, 162 and 172 via the Ethernet Network 120.

In some embodiments, the Peripheral Processing Devices 122-124 can be in communication with the Ethernet Network 120 via any suitable connection such as, for example, an optical connection (e.g., an optical cable and optical connectors), an electrical connection (e.g., an electrical cable and electrical connectors) and/or the like. Similarly stated, each of the FCoE Ports 152, 162 and 172 can provide a communication interface through which a Peripheral Processing Device 122-124 can be operatively coupled to the Ethernet Network 120.

As such, the Peripheral Processing Devices 122-124 are configured to send data (e.g., Ethernet frames, FCoE frames, data frames, data cells, etc.) to and receive data from the Ethernet Network 120. In some embodiments, each connection between the Peripheral Processing Devices 122-124 and the Ethernet Network 120 is a direct link. Such a link can be said to be a single physical hop link. In other embodiments, the Peripheral Processing Devices 122-124 can be operatively coupled to the Ethernet Network 120 via intermediate modules or devices. Such a connection can be said to be a multiple physical hop link.

In some embodiments, any combination of the Peripheral Processing Devices 122-124 can be physically located within the same physical chassis as one another and/or any other device included in the Ethernet Network 120. In other embodiments, each of the Peripheral Processing Devices 122-124 can be located within a different chassis.

The FCoE ports 152, 162 and 172 can be physical Ethernet ports capable of sending and/or receiving one or more Ethernet and/or FCoE frames. In some embodiments, each of the FCoE ports 152, 162 and 172 can be associated with and/or located on a physical line card (not shown in FIG. 1), such as an Ethernet NIC. In some embodiments, each of the FCoE ports 152, 162 and 172 can include and/or be associated with a frame formatter module (not shown in FIG. 1) included in each of the Peripheral Processing Devices 122-124, respectively. These frame formatter modules can each be configured to encapsulate Fibre Channel frames received from a virtual Fibre Channel N port within FCoE frames for transmission via the Ethernet Network 120. In such embodiments, each such frame formatter module can be further configured to decapsulate and/or extract Fibre Channel frames from within FCoE frames received via the Ethernet Network 120.

The Virtual Fibre Channel N Ports 153-155, 163-165 and 173-175 can be virtual Fibre Channel N ports similar to those generally associated with Fibre Channel and/or FCoE networks. In some embodiments, one or more of the Virtual Fibre Channel N Ports 153-155, 163-165 and 173-175 can constitute one of two virtual end nodes that define a virtual link. In such embodiments, each such Virtual Fibre Channel N Port can each be operatively coupled to a Virtual Fibre Channel F Port from the Virtual Fibre Channel F Ports 181-189 instantiated at the Fibre Channel Switch 130.

The Fibre Channel Switch 130 can be any combination of hardware and/or software (executing in hardware) configured to perform switching of Fibre Channel frames received from the Gateway Device 110 and/or the Fibre Channel Network 140. As shown in FIG. 1, the Fibre Channel Switch 130 is situated between the Gateway Device 110 and the Fibre Channel Network 140, and can be configured to perform known switching tasks on Fibre Channel frames and/or packets transmitted between the Gateway Device 110 and the Fibre Channel Network 140. In some embodiments, the Fibre Channel Switch 130 can be a Fibre Channel Forwarder (FCF). As also shown in FIG. 1, the Fibre Channel Switch 130 includes Fibre Channel Ports 132-134, each of which is operatively and/or physically coupled to one of the Fibre Channel Ports 116-118 on the Gateway Device 110. In some embodiments, each of the Fibre Channel Ports 132-134 can be a Fibre Channel port configured to exchange one or more Fibre Channel frames with a single Fibre Channel port from the Fibre Channel Ports 116-118.

In some embodiments and as described in further detail herein, the Fibre Channel Ports 132-134 can be designated as either primary ports or secondary ports. For example, the Fibre Channel Ports 132 and 133 can be designated as primary ports and the Fibre Channel Port 134 can be designated as a secondary port. In such an example, if an error is detected at either Fibre Channel Port 132 or Fibre Channel Port 133 (i.e., the primary ports), the data traffic to be sent on the primary Fibre Channel Port 132 or 133 having an error can be sent via the secondary Fibre Channel Port 134. More specifically, the Fibre Channel Switch 130 can associate the virtual ports 181-189 associated with the primary port 132 or 133 having the error with the secondary port 134. For example, if an error is detected at Fibre Channel Port 132, the Virtual Fibre Channel F Ports 181 and 182 can be associated with the secondary port 134. Accordingly, the Virtual Fibre Channel F Ports 181 and 182 can continue to send and receive data (e.g., Fibre Channel frames and/or packets).

In some embodiments, a primary Fibre Channel Port 132-134 can be operatively and/or physically coupled to a primary Fibre Channel Port 116-118 of the Gateway Device 110. For example, both the Fibre Channel Port 116 and the Fibre Channel Port 132 can be primary Fibre Channel ports. Moreover, both the Fibre Channel Port 118 and the Fibre Channel Port 134 can be secondary Fibre Channel ports. In such embodiments, if an error is detected at either the Fibre Channel Port 116 or the Fibre Channel Port 132, the virtual ports associated with the Fibre Channel Port 116 and the Virtual Fibre Channel F Ports 181 and 182 associated with the Fibre Channel Port 132, can be associated with the Fibre Channel Port 118 and the Fibre Channel Port 134, respectively.

In some embodiments, each of the Virtual Fibre Channel F Ports 181-189 can be operatively coupled to and/or associated with one of the Virtual Fibre Channel N Ports 153-155, 163-165 and 173-175 instantiated at the Peripheral Processing Devices 122, 123 and 124, respectively. In such embodiments, each of the Virtual Fibre Channel F Ports 181-189 can exchange Fibre Channel frames with a single virtual Fibre Channel N port from the Virtual Fibre Channel N Ports 153-155, 163-165 and 173-175, thus defining a virtual link between those two virtual Fibre Channel ports. As described in further detail herein, such an exchange can be via a virtual port (not shown in FIG. 1) associated with one of the Fibre Channel Ports 116-118 of the Gateway Device 110.

The Virtual Fibre Channel F Ports 181-189 can be virtual Fibre Channel F ports similar to those generally associated with Fibre Channel and/or FCoE networks. In some embodiments, one or more of the Virtual Fibre Channel F Ports 181-189 can constitute one of two virtual end nodes that define a virtual link. For example, as described above, each such Virtual Fibre Channel F Port can be uniquely associated with a Virtual Fibre Channel N Port from the Virtual Fibre Channel N Ports 153-155, 163-165 and 173-175, thus defining a virtual link.

In some embodiments, the Fibre Channel Switch 130 can perform initialization and/or login functions for a Fibre Channel and/or an FCoE network. In some embodiments, the Gateway Device 110 can receive initialization requests from the Virtual Fibre Channel N Ports 153-155 according to a standard protocol such as a FCoE Initialization Protocol (FIP). In such embodiments, the Gateway Device 110 can decapsulate the initialization request and send fabric login (FLOGI) signals, fabric discovery (FDISC) signals, and/or any other suitable initialization signals to the Fibre Channel Switch 130. Such initialization signals can be sent by the Gateway Device 110 for each Fibre Channel Port 116-118 and/or each virtual port (not shown) associated with the Fibre Channel Ports 116-118. In response to receiving such initialization protocols, the Fibre Channel Switch 130 can assign a virtual port and/or physical port (e.g., Fibre Channel Ports 116-118) a Fibre Channel identifier (FCID) and/or the like. Additionally, the Fibre Channel Switch 130 can send the Gateway Device 110 a logical identifier (e.g., a logical World Wide Name (WWN)) of the Fibre Channel F Port 132-134 to which the initialization signal was sent. This logical identifier can be associated with a Fibre Channel Port 116-118 of the Gateway Device 110. Additionally, in some embodiments and as described in further detail herein, a login signal for a Fibre Channel Port 116-118 sent from the Gateway Device 110 to the Fibre Channel Switch 130 can include an identifier of whether that Fibre Channel Port 116-118 is a primary or secondary port.

Additionally, the Fibre Channel Switch 130 can receive initialization and/or login signals (including FLOGI, FDISC, etc.) for each Virtual Fibre Channel N Port 153-155, 163-165, 173-175. Based on these initialization and/or login signals, the Fibre Channel Switch 130 can provide each Virtual Fibre Channel N Port 153-155, 163-165, 173-175 with an FCID. Additionally, the Fibre Channel Switch 130 can send the Gateway Device 110 a logical identifier (e.g., a logical WWN) of the Fibre Channel F Port 132-134 to which the initialization signal was sent. For example, if the Gateway Device 110 sends an initialization request to the Fibre Channel F Port 132 for the Virtual Fibre Channel N Port 153, the Fibre Channel Switch 130 can send a logical identifier of the Fibre Channel F Port 132 to the Gateway Device 110. The Gateway Device 110 can then send the logical identifier of the Fibre Channel F Port 132 to the Peripheral Processing Device 122 such that the Peripheral Processing Device 122 can use the logical identifier of the Fibre Channel F Port 132 when addressing data packets to be sent to the Fibre Channel Switch 130. Additional details regarding the login and/or initialization signals are shown and described in co-pending U.S. patent application Ser. No. 12/976,200, filed on the same date, and entitled "Apparatus and Methods to Aggregate FCOE (Fibre Channel over Ethernet) Filter Rules of a Single Interface in a Single or Few Rules on a First-Hop FCoE Networking Element," and U.S. patent application Ser. No. 12/976, 222, filed on the same date, and entitled "Methods and Apparatus for Providing Unique MAC Address to Individual Node For Fibre Channel Over Ethernet (FCOE) Traffic," each of which is incorporated herein by reference in its entirety.

In some embodiments, the Fibre Channel Switch 130 can include multiple physical devices. In some embodiments, the Fibre Channel Switch 130 can include a Fibre Channel Switch Fabric, such as a multi-stage Fibre Channel fabric. In such embodiments, the Fibre Channel Switch 130 can be included in, for example, a data center, and can be define one or more logical hierarchical elements, such as virtual data center fabrics (VDCFs) and/or virtual local area networks (VLANs).

The Fibre Channel Network 140 can be any combination of hardware devices and/or software modules (executing in hardware) that together comprise a Fibre Channel network. For example, although not shown in FIG. 1, the Fibre Channel Network 140 can include one or more Fibre Channel-compatible servers and/or peripheral devices connected to one or more Fibre Channel switching devices including one or more Host Bus Adapters (HBAs). In some embodiments, the Fibre Channel Network 140 can include one or more subnetwork portions, such as one or more Fibre Channel zones and/or storage area networks (SANs). As shown in FIG. 1, the Fibre Channel Network 140 can be operatively coupled to the Peripheral Processing Devices 122-124 via the Ethernet Network 120, the Gateway Device 110 and the Fibre Channel Switch 130. In such embodiments, the Fibre Channel Network 140 can thus exchange data with the Peripheral Processing Devices 122-124.

Figure 2:
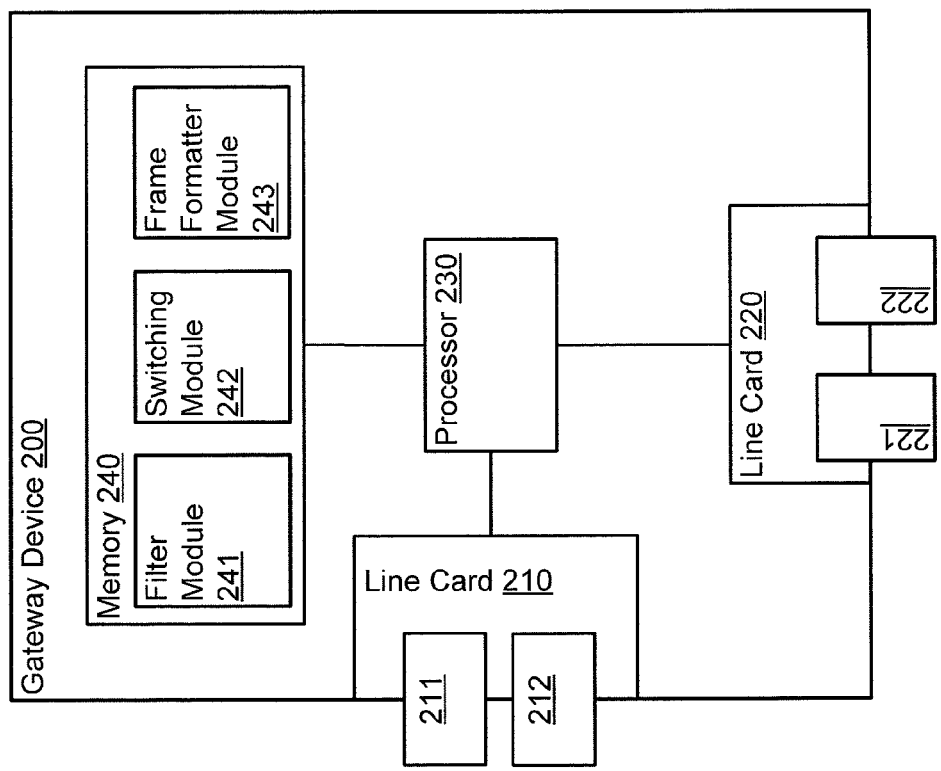
FIG. 2 is a schematic illustration of a gateway device of a mixed Fibre Chanel/Ethernet network portion, according to another embodiment.

FIG. 2 is a schematic illustration of a gateway device of a mixed Fibre Chanel/Ethernet network portion, according to another embodiment. More specifically, FIG. 2 is a system block diagram of a Gateway Device 200, similar to the Gateway Device 110 described in connection with FIG. 1 above. The Gateway Device 200 includes a Processor 230, a Memory 240, a Line Card 210 and a Line Card 220. The Memory 240 includes a Filter Module 241, a Switching Module 242 and a Frame Formatter Module 243. The Line Card 210 includes the Physical Ports 211 and 212, and the Line Card 220 includes the Physical Ports 221 and 222. The Processor 230 is operatively coupled to the Memory 240, the Line Card 210 and the Line Card 220. In some embodiments, the Line Cards 210 and/or 220 include one or more processors and/or memories (not shown in FIG. 2).

Similar to the Ethernet Ports 112-114 of the Gateway Device 110 (shown in FIG. 1), the Physical Ports 211-212 and 221-222 can be configured to communicate with Ethernet and/or Fibre Channel peripheral processing devices via an Ethernet Network. Additionally or alternatively, similar to the Fibre Channel Ports 116-118 (shown in FIG. 1), the Physical Ports 211-212 and 221-222 can be configured to communicate with Fibre Channel devices, such as Fibre Channel switches. For example, the Physical Ports 211-212 and 221-222 can implement a physical layer using twisted-pair electrical signaling via electrical cables or fiber-optic signaling via fiber-optic cables. In some embodiments, some of the Physical Ports 211-212 and 221-222 can implement one physical layer such as twisted-pair electrical signaling, and others of the Physical Ports 211-212 and 221-222 can implement a different physical layer, such as fiber-optic signaling. Furthermore, the Physical Ports 211-212 and 221-222 can be configured to allow the Gateway Device 200 to communicate with peripheral processing devices and/or switching devices via a common protocol such as Ethernet, Fibre Channel and/or FCoE. In some embodiments, some of the Physical Ports 211-212 and 221-222 can implement one protocol such as Ethernet/FCoE and others of the Physical Ports 211-212 and 221-222 can implement a different protocol such as Fibre Channel. Thus, the Gateway Device 200 can be in communication with multiple peripheral processing and/or switching devices using homogeneous or heterogeneous physical layers and/or protocols via the Physical Ports 211-212 and 221-222.

In some embodiments, the Gateway Device 200 can be configured to prepare a data frame or packet (e.g., an Ethernet or FCoE frame and/or packet) for transmission to a peripheral processing device (e.g., one of the Peripheral Processing Devices 122-124) or a Fibre Channel device (e.g., the Fibre Channel Switch 130). For example, the Frame Formatter Module 243 can be configured to forward, classify, and/or modify the frame encapsulation (e.g., modify, add and/or remove a header portion, footer portion and/or any other identifier included within the data frame) of a data frame prior to sending the data frame to the communications network. Additionally, the Frame Formatter Module 243 can be configured to partition and/or divide the data frame into data cells (e.g., having fixed length payloads) prior to sending the data cells to the switch fabric. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

In some embodiments, the Gateway Device 200 includes a control plane module and/or portion (not shown in FIG. 2). In such embodiments, the control plane module and/or portion can store and/or maintain a state associated with the Physical Ports 211-212 and 221-222. For example, the control plane module and/or portion can maintain a database storing an association between the Physical Ports 211-212 and 221-222 and their associated virtual ports at the Gateway Device 200. Additionally, in some embodiments, and as described in further detail herein, the control plane module and/or portion can send control signals to and/or receive control signals from a control plane module and/or portion of a Fibre Channel switch (e.g., Fibre Channel Switch 300, described in further detail herein).

In some embodiments, the Gateway Device 200 can be configured to define one or more filters, switching policies and/or rules that dictate how and to where data frames and/or packets are transmitted by the Gateway Device 200. For example, the Filter Module 241 stored at the Memory 240 can be configured to define a filter stipulating that all data frames received from a particular logical and/or physical address should in turn be sent to a device or module having a specified logical and/or physical address. Alternatively, the Filter Module 241 can define a filter stipulating that all data frames of a particular type (such as FCoE, Ethernet, or Fibre Channel) and/or having a particular priority indicator should be sent via one of a specified set of ports (such as one of the Fibre Channel Ports 116-118 shown in FIG. 1). In some embodiments, the Gateway Device 200 can be configured to route data frames and/or packets according to one or more filters. For example, the Switching Module 242 stored at the Memory 240 can send or forward an FCoE frame to a specified peripheral processing device based at least in part on a filter defined by the Filter Module 241.

Figure 3:
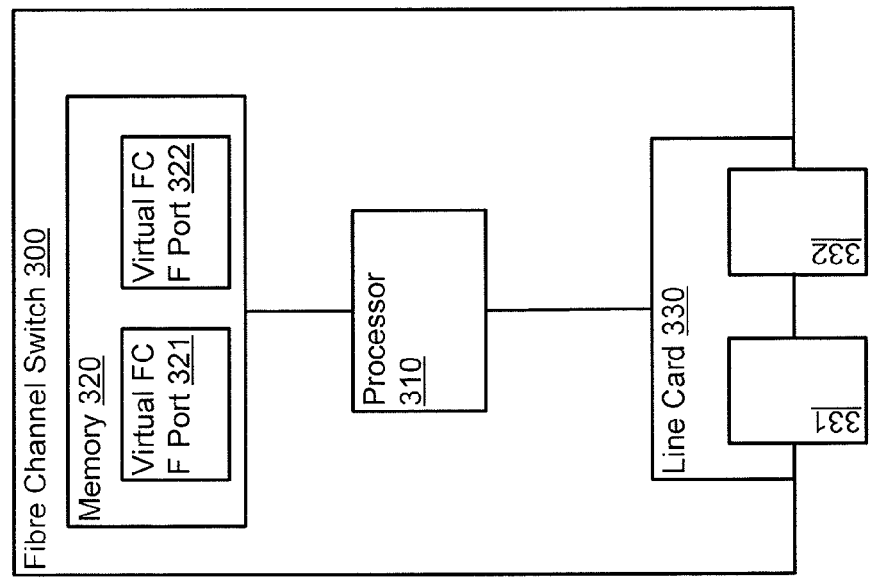
FIG. 3 is a schematic illustration of a Fibre Channel switch of a mixed Fibre Chanel/Ethernet network portion, according to another embodiment.

FIG. 3 is a schematic illustration of a Fibre Channel switch, according to another embodiment. More specifically, FIG. 3 is a system block diagram of a Fibre Channel Switch 300 substantially similar to the Fibre Channel Switch 130 described in connection with FIG. 1 above, according to an embodiment. The Fibre Channel Switch 300 includes a Processor 310, a Memory 320, and a Line Card 330. The Line Card 330 includes Fibre Channel Ports 331 and 332. The Processor 310 is operatively coupled to the Memory 320 and the Line Card 330. The Memory 320 includes Virtual Fibre Channel F Port 321 and Virtual Fibre Channel F Port 322. The Fibre Channel Switch 300 can communicate with other Fibre Channel devices, such as an FCoE gateway (similar to the Gateway Device 110 shown in FIG. 1), via the Fibre Channel Ports 331 and 332.

In some embodiments, the Fibre Channel Switch 300 can perform typical network switching functions on Fibre Channel frames. The Fibre Channel Switch 300 can, for example, receive a Fibre Channel frame from a gateway device and route that Fibre Channel frame to an appropriate next-hop device within a Fibre Channel network to which the Fibre Channel Switch 300 is coupled. In some embodiments, the Fibre Channel Switch 300 can communicate with one or more peripheral processing devices (e.g., one of the Peripheral Processing Devices 322-324) via the Virtual Fibre Channel F Port 321 and/or the Virtual Fibre Channel F Port 322. For example, the Fibre Channel Switch 300 can send a Fibre Channel frame from the Virtual Fibre Channel F Port 321 for ultimate transmission to a virtual Fibre Channel N port instantiated at a peripheral processing device (e.g., the Virtual Fibre Channel N Port 173 instantiated at the Peripheral Processing Device 124 in FIG. 1).

In some embodiments, the Fibre Channel Switch 200 can be configured to perform Fibre Channel login and/or initialization procedures. In some embodiments, the Fibre Channel Switch 200 can receive a FLOGI and/or an FDISC signal from a Fibre Channel port and/or device (e.g., a virtual Fibre Channel port such as a virtual Fibre Channel N port, a physical Fibre Channel port, a peripheral processing device, etc.). In response to receiving the FLOGI and/or FDISC signal, the Fibre Channel Switch 200 can provide the Fibre Channel port and/or device with a logical and/or physical identifier (e.g., an FCID, a logical WWN associated with the virtual Fibre Channel Port 321-322 on which the login was performed, etc.).

In some embodiments, the Fibre Channel Switch 200 includes a control plane module and/or portion (not shown in FIG. 3). In such embodiments, the control plane module and/or portion can store and/or maintain a state associated with the Fibre Channel Ports 331 and 332. For example, the control plane module and/or portion can maintain a database storing an association between the Fibre Channel Ports 331 and 332 and their associated Virtual Fibre Channel F Ports 321, 322 at the Fibre Channel Switch 300. Additionally, in some embodiments, and as described in further detail herein, the control plane module and/or portion can send control signals to and/or receive control signals from a control plane module and/or portion of a gateway device (e.g., Gateway Device 200, shown and described with respect to FIG. 2).

Figure 4:
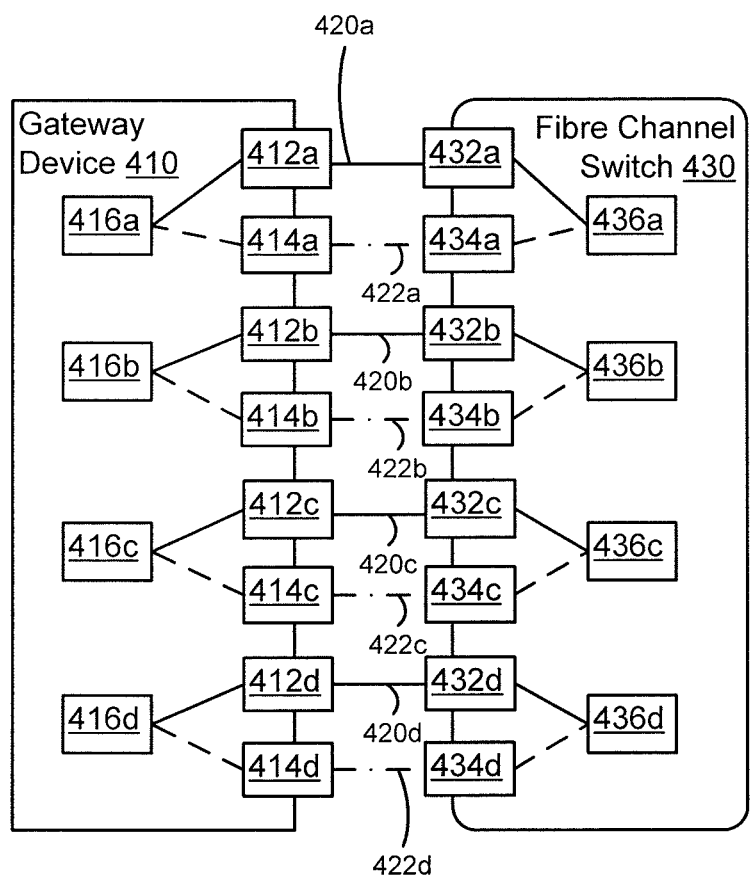
FIG. 4 is a schematic illustration of an interface between a gateway device and a Fibre Channel switch, according to another embodiment.

FIG. 4 is a schematic illustration of an interface 400 between a gateway device 410 and a Fibre Channel switch 430, according to another embodiment. Such an interface can be similar to the interface between the Gateway Device 110 and the Fibre Channel Switch 130 shown and described with respect to FIG. 1. As such, while not shown in FIG. 4, the gateway device 410 and the Fibre Channel switch 430 can be a portion of a larger network and/or network segment.

The gateway device 410 can be similar to the Gateway Device 200 shown and described with respect to FIG. 2. More specifically, the gateway device 410 can be a Fibre Channel over Ethernet (FCoE) to Fibre Channel (FC) gateway device. As such, the gateway device 410 can receive an FCoE frame from an Ethernet network (not shown in FIG. 4), remove an Ethernet encapsulation from the FCoE frame to define an FC frame, and send the FC frame to the Fibre Channel switch 430. Similarly, the gateway device 410 can receive an FC frame from the Fibre Channel switch 430, encapsulate the FC frame as an Ethernet frame to define an FCoE frame, and send the FCoE frame to the Ethernet network.

The gateway device includes multiple primary Fibre Channel ports 412a-412d and multiple secondary Fibre Channel ports 414a-414d. Such Fibre Channel ports 412a-412d and 414a-414d can be structurally similar to the Fibre Channel ports 116-118 of Gateway Device 110 shown and described with respect to FIG. 1. Accordingly, the Fibre Channel ports 412a-412d and 414a-414d can be configured to receive Fibre Channel frames from and send Fibre Channel frames to the Fibre Channel switch 430.

As shown in FIG. 4, each primary Fibre Channel port 412a-412d can be associated with a secondary Fibre Channel port 414a-414d. For example, primary Fibre Channel port 412a is associated with secondary Fibre Channel port 414a, primary Fibre Channel port 412b is associated with secondary Fibre Channel port 414b, primary Fibre Channel port 412c is associated with secondary Fibre Channel port 414c, and primary Fibre Channel port 412d is associated with secondary Fibre Channel port 414d. As described in further detail herein, each secondary Fibre Channel port 414a-414d can be used as a backup port for its associated primary Fibre Channel port 412a-412d. For example, if an error is detected at the primary Fibre Channel port 412a, the data frames and/or packets to be sent to the Fibre Channel switch 430 via the primary Fibre Channel port 412a can be sent to the Fibre Channel switch 430 via the secondary Fibre Channel port 414a.

The primary Fibre Channel ports 412a-412d are each associated with at least one virtual port 416a-416d. While described herein as each primary Fibre Channel port 412a-412d being associated with a virtual port 416a-416d, in some embodiments, each primary Fibre Channel port 412a-412d is associated with multiple virtual ports and/or a group of virtual ports. Such virtual ports 416a-416d can be used as an interface between one or more virtual ports 436a-436d of the Fibre Channel switch 430 and one or more virtual Fibre Channel ports at one or more devices coupled to the gateway device (e.g., Peripheral Processing Devices 122-124, shown and described with respect to FIG. 1). In some embodiments and as described in further detail herein, each virtual port 416a-416d can be uniquely associated with a virtual port 436a-436d of the Fibre Channel switch 430. Accordingly, each virtual port 416a-416d can send data to and/or receive data from its uniquely associated virtual port 436a-436d.

The Fibre Channel switch 430 can be structurally and functionally similar to the Fibre Channel Switch 300, shown and described with respect to FIG. 3. Accordingly, the Fibre Channel switch 430 can perform typical network switching functions on Fibre Channel frames and/or packets.

The Fibre Channel switch 430 includes multiple primary Fibre Channel ports 432a-432d and multiple secondary Fibre Channel ports 434a-434d. Such Fibre Channel ports 432a-432d and 434a-434d can be structurally similar to the Fibre Channel ports 132-134 of Fibre Channel Switch 130 shown and described with respect to FIG. 1. Accordingly, the Fibre Channel ports 432a-432d and 434a-434d can be configured to receive Fibre Channel frames from and send Fibre Channel frames to the gateway device 410.

As shown in FIG. 4, each primary Fibre Channel port 432a-432d can be associated with a secondary Fibre Channel port 434a-434d. For example, primary Fibre Channel port 432a is associated with secondary Fibre Channel port 434a, primary Fibre Channel port 432b is associated with secondary Fibre Channel port 434b, primary Fibre Channel port 432c is associated with secondary Fibre Channel port 434c, and primary Fibre Channel port 432d is associated with secondary Fibre Channel port 434d. As described in further detail herein, each secondary Fibre Channel port 434a-434d can be used as a backup port for its associated primary Fibre Channel port 432a-432d. For example, if an error is detected at the primary Fibre Channel port 432a, the data frames and/or packets to be sent to the gateway device 410 via the primary Fibre Channel port 432a can be sent to the gateway device 410 via the secondary Fibre Channel port 434a.

The primary Fibre Channel ports 432a-432d are each associated with at least one virtual port 436a-436d. Such virtual ports 436a-436d can be functionally similar to the Virtual Fibre Channel F Ports 181-189 of the Fibre Channel Switch 130, shown and described above with respect to FIG. 1. In some embodiments, one or more of the virtual ports 436a-436d can constitute one of two virtual end nodes that define a virtual link. For example, each such virtual port 436a-436d can be uniquely associated with a virtual Fibre Channel N port at a peripheral processing device (not shown in FIG. 4) operatively coupled to the gateway device 410.

Additionally, as described above, each virtual port 436a-436d can be uniquely associated with a virtual port 416a-416d at the gateway device 410. Accordingly, each virtual port 436a-436d can send data to and/or receive data from a virtual Fibre Channel N port at a peripheral processing device operatively coupled to the gateway device via a virtual port 416a-416d at the gateway device 410. For example, the virtual port 436a can send data to and/or receive data from a virtual Fibre Channel N port (e.g., at a peripheral processing device coupled to gateway device 410) via the virtual port 416a, the virtual port 436b can send data to and/or receive data from a virtual Fibre Channel N port via the virtual port 416b, the virtual port 436c can send data to and/or receive data from a virtual Fibre Channel N port via the virtual port 416c, and the virtual port 436d can send data to and/or receive data from a virtual Fibre Channel N port via the virtual port 416d.

Each of the Fibre Channel ports 412a-412d and 414a-414d of the gateway device 410 is physically and operatively coupled to a Fibre Channel port 432a-432d and 434a-434d of the Fibre Channel switch 430 via a data path 420a-420d and 422a-422d, respectively. More specifically, as shown in FIG. 4, each primary Fibre Channel port 412a-412d of the gateway device 410 can be coupled to a primary Fibre Channel port 432a-432d of the Fibre Channel switch 430 by a data path 420a-420d. Similarly, each secondary Fibre Channel port 414a-414d of the gateway device 410 can be coupled to a secondary Fibre Channel port 434a-434d of the Fibre Channel switch 430 by a data path 422a-422d.

The data paths 420a-420d and 422a-422d between the gateway device 410 and the Fibre Channel switch 430 can be any suitable data paths. In some embodiments, for example, the data paths 420a-420d and 422a-422d can include optical connections (e.g., optical cables and/or optical connectors), electrical connections (e.g., electrical cables, electrical connectors, and/or electrical traces), and/or the like.

In use, each primary data port 412a-412d of the gateway device 410 can send a login signal to the Fibre Channel switch 430. For example, each primary Fibre Channel port 412a-412d can send a Fabric Login (FLOGI) signal and/or a Fabric Discovery (FDISC) signal to the Fibre Channel switch 430. In some embodiments, such a login signal can also include a parameter that indicates that the primary Fibre Channel port 412a-412d is a primary data port. In response to receiving the FLOGI signal and/or the FDISC signal, the Fibre Channel switch 430 can provide, to the requesting primary Fibre Channel port 412a-412d, a logical identifier (e.g., a logical World Wide Name (WWN)) of the primary Fibre Channel port 432a-432d on which the login and/or initialization procedure was performed. The gateway device 410 can associate the primary Fibre Channel port 412a-412d with this logical WWN such that when data addressed using this logical WWN is received at the gateway device 410, such data can be sent to the Fibre Channel switch 430 via that primary Fibre Channel port 412a-412d. Additionally, the Fibre Channel switch 430 can assign a logical identifier (e.g., a Fibre Channel Identifier (FCID)) to the requesting primary Fibre Channel port 412a-412d. Such an identifier can be sent to the gateway device 410.

Additionally, each secondary data port 414a-414d of the gateway device 410 can send a login signal to the Fibre Channel switch 430. For example, each secondary Fibre Channel port 414a-414d can send a FLOGI signal to the Fibre Channel switch 430. In some embodiments, such a login signal can also include a parameter that indicates that the secondary Fibre Channel port 414a-414d is a secondary data port. In some embodiments, because the sending secondary Fibre Channel port 414a-414d is a secondary Fibre Channel port, the secondary Fibre Channel port 414a-414d does not send an FDISC signal. In other embodiments, the secondary Fibre Channel port 414a-414d can also send an FDISC signal.

In response to receiving the FLOGI signal, the Fibre Channel switch 430 can provide, to the requesting secondary Fibre Channel port 414a-414d, a logical identifier (e.g., a logical World Wide Name (WWN)) of the secondary Fibre Channel port 434a-434d on which the login and/or initialization procedure was performed. Such logical identifier can be the same as the logical identifier provided to the primary Fibre Channel port 412a-412d. Accordingly, in some embodiments, each secondary Fibre Channel port 434a-434d is associated with the same identifier as its associated primary Fibre Channel port 432a-432d. The gateway device 410 can associate the secondary Fibre Channel port 414a-414d with this logical WWN. Accordingly, a secondary Fibre Channel port 414a-414d can be associated with a common logical WWN as its associated primary Fibre Channel port 412a-412d.

Additionally, the Fibre Channel switch 430 can assign a logical identifier (e.g., a Fibre Channel Identifier (FCID)) to the requesting secondary Fibre Channel port 412a-412d. The logical identifier can be the same as the logical identifier of the primary Fibre Channel port 412a-412d associated with the requesting secondary Fibre Channel port 412a-412d. For example, the secondary Fibre Channel port 414a can be assigned the same logical identifier as the primary Fibre Channel port 412a. Such identifiers can be sent to the gateway device 410.

In some embodiments, the gateway device 410 can associate each primary Fibre Channel port 412a-412d with a virtual port 416a-416d in response to receiving identifiers associated with the primary Fibre Channel ports 412a-412d from the Fibre Channel switch 430. In some embodiments, however, the gateway device 410 does not initially associate the secondary Fibre Channel ports 414a-414d with virtual ports 416a-416d as data is not initially sent via these ports. Similarly, the Fibre Channel switch 430 can associate each primary Fibre Channel port 432a-432d with a virtual port 436a-436d. Additionally, in some embodiments, the Fibre Channel switch 430 does not initially associate each secondary Fibre Channel port 434a-434d with a virtual port 436a-436d.

Each virtual port 416a-416d of the gateway device 410 can receive data (e.g., data frames, packets and/or cells) from a virtual Fibre Channel N port of a peripheral processing device (not shown in FIG. 4) operatively coupled to the gateway device 410. The virtual port 416a-416d can send the data to its associated virtual port 436a-436d of the Fibre Channel switch 430 via its associated primary Fibre Channel port 412a-412d, a primary data path 420a-420d and an associated primary Fibre Channel port 432a-432d. For example, virtual port 416a can receive a data frame and/or packet from a virtual Fibre Channel N port and send the data frame and/or packet to the virtual port 436a via the primary Fibre Channel port 412a, the primary data path 420a, and the primary Fibre Channel port 432a. Similarly, the virtual port 436a can send a data from and/or packet to the virtual port 416a via the primary Fibre Channel port 432a, the primary data path 420a, and the primary Fibre Channel port 412a. Similarly, the virtual ports 416b-416d can send data to and/or receive data from their associated virtual ports 436b-436d via the primary Fibre Channel ports 412b-412d, the primary data paths 420b-420d, and the primary Fibre Channel ports 432b-432d, respectively.

If an error is detected at a primary Fibre Channel port 412a-412d, the gateway device 410 can associate the virtual port 416a-416d associated with that primary Fibre Channel port 412a-412d with that primary Fibre Channel port's 412a-412d associated secondary Fibre Channel port 414a-414d. For example, if the gateway device 410 detects an error at the primary Fibre Channel port 412a, the gateway device 410 can associate the virtual port 416a with the secondary Fibre Channel port 414a. Accordingly, the virtual port 416a can send data to the virtual port 436a via the secondary Fibre Channel port 414a, the secondary data path 422a, and the secondary Fibre Channel port 434a. More specifically, the virtual port 416a can send data addressed using a logical identifier (e.g., an FCID or a logical WWN) associated with the primary Fibre Channel port 412a to the secondary Fibre Channel port 414a. Because the gateway device 410 can associate the virtual port 416a with the secondary Fibre Channel port 414a substantially immediately after detecting an error at the primary Fibre Channel port 412a, the virtual port 416a does not send a subsequent login signal to the Fibre Channel switch 430.

Similarly, if an error is detected at a primary Fibre Channel port 432a-432d, the Fibre Channel switch 430 can associate the virtual port 436a-436d associated with that primary Fibre Channel port 432a-432d with that primary Fibre Channel port's 432a-432d associated secondary Fibre Channel port 434a-434d. For example, if the Fibre Channel switch 430 detects an error at the primary Fibre Channel port 432a, the Fibre Channel switch 430 can associate the virtual port 436a with the secondary Fibre Channel port 434a. Accordingly, the virtual port 436a can send data to the virtual port 416a via the secondary Fibre Channel port 434a, the secondary data path 422a, and the secondary Fibre Channel port 414a.

In some embodiments, after an error with a primary Fibre Channel port 412a-412d is detected, the gateway device 410 can send a control signal to the Fibre Channel switch 430 via a control plane connection (not shown in FIG. 4). More specifically, a control plane module and/or portion of the gateway device 410 can send the control signal to a control plane module and/or portion of the Fibre Channel switch 430. Such a control plane connection can be an out-of-band connection (i.e., within a different data path than the data paths 420a-420d and 422a-422d) or an in-band connection (i.e., within a common data path as the data paths 420a-420d or 422a-422d). The control signal can indicate to the Fibre Channel switch 430 that an error was detected at a primary Fibre Channel port 412a-412d and that the virtual port 436a-436d should send data to its associated virtual port 416a-416d using a secondary port 434a-434d. In some embodiments, an identifier of the secondary port 434a-434d with which the Fibre Channel switch 430 should associate the virtual port 416a-416d can be specified and/or included within the control signal. Similarly, after an error with a primary Fibre Channel port 432a-432d is detected, the Fibre Channel switch 430 can send a similar control signal to the gateway device 410.

In some embodiments, because each primary Fibre Channel port 412a-412d includes a dedicated secondary Fibre Channel port 414a-414d, the gateway device 410 can associate a virtual port 416a-416d with its secondary Fibre Channel port 414a-414d prior to sending a control signal to the Fibre Channel switch 430. Similarly stated, because the secondary Fibre Channel port 414a is initially (e.g., at start-up and/or login) associated with the same logical identifier as its associated primary Fibre Channel port 412a (e.g., the same FCID and/or the a primary Fibre Channel port 432a-432d has a same logical WWN as an associated secondary Fibre Channel port 434a-434d), the gateway device 410 can begin sending data to its associated virtual port 436a-436d via its associated secondary Fibre Channel port 414a-414d substantially immediately after an error is detected at the associated primary Fibre Channel port 412a-412d. In such embodiments, the virtual port 436a-436d of the Fibre Channel switch 430 can receive data from its associated secondary Fibre Channel port 434a-434d prior to the Fibre Channel switch 430 associating the virtual port 436a-436d with its associated secondary port 434a-434d in response to receiving the control signal. Similarly, the Fibre Channel switch 430 can associate a virtual port 436a-436d with its associated secondary Fibre Channel port 434a-434d prior to sending a control signal to the gateway device 410.

Figure 5:
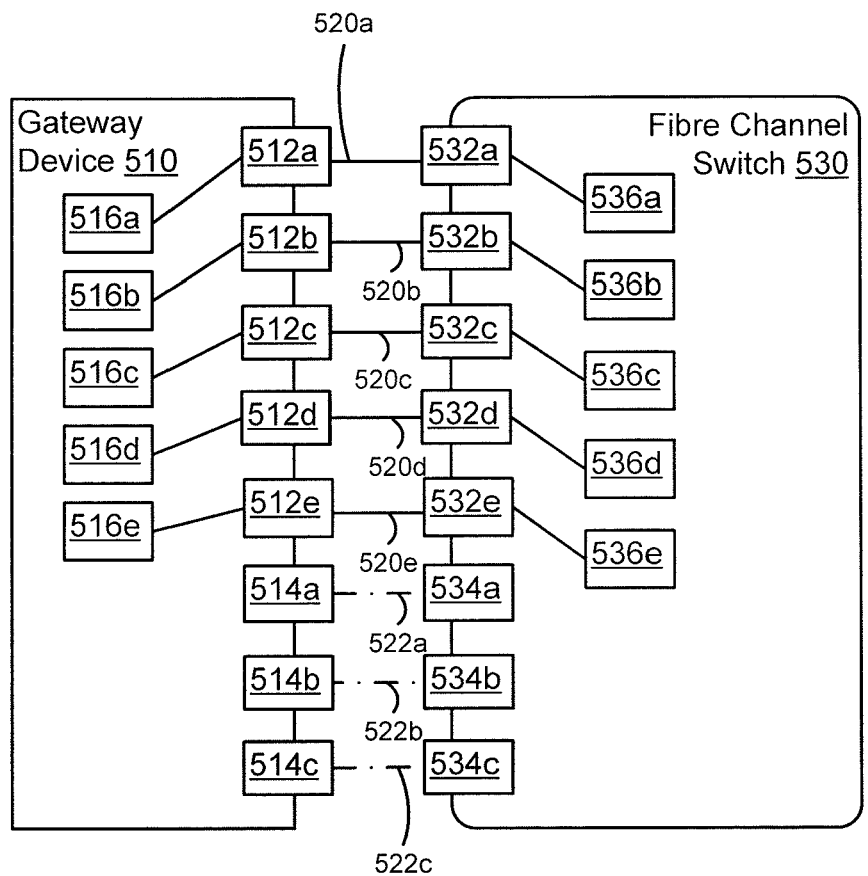
FIG. 5 is a schematic illustration of an interface between a gateway device and a Fibre Channel switch, in a first configuration, according to another embodiment.
Figure 6:
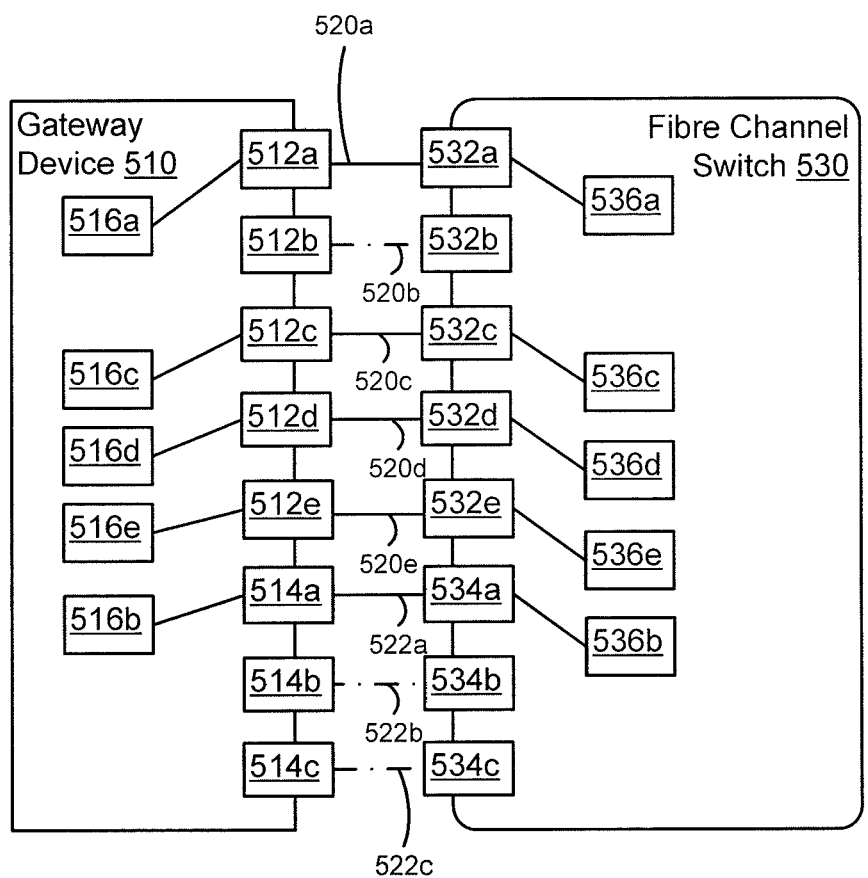
FIG. 6 is a schematic illustration of the interface between the gateway device and the Fibre Channel switch shown in FIG. 5, in a second configuration.

While shown in FIG. 4 as having a specific associated secondary Fibre Channel port, in other embodiments, each primary Fibre Channel port does not include a specific associated secondary Fibre Channel port. For example, a gateway device and/or a Fibre Channel switch can have an unequal number of primary Fibre Channel ports and secondary Fibre Channel ports. FIGS. 5 and 6 illustrate such an interface 500 in a first configuration and a second configuration, respectively. While the interface 500 is shown and described as being in a first configuration and a second configuration, a gateway device 510 of the interface 500 and/or a Fibre Channel switch 530 of the interface 500 can similarly be said to be in a first configuration when the interface 500 is in the first configuration and a second configuration when the interface 500 is in the second configuration.

Similar to the interface 400 shown and described with respect to FIG. 4, the interface 500 includes a gateway device 510 and a Fibre Channel switch 530. The gateway device 510 includes primary Fibre Channel ports 512a-512e and secondary Fibre Channel ports 514a-514c, similar to the primary Fibre Channel ports 412a-412d and the secondary Fibre Channel ports 414a-414d, shown and described with respect to FIG. 4. The gateway device 510 also includes virtual ports 516a-516e, similar to the virtual ports 416a-416d, shown and described with respect to FIG. 4. As shown in FIG. 5, when the interface 500 is in the first configuration, each primary Fibre Channel port 512a-512e is associated with a virtual port 516a-516e. While described herein as each primary Fibre Channel port 512a-512e being associated with a virtual port 516a-516e, in some embodiments, each primary Fibre Channel port 512a-512e is associated with multiple virtual ports and/or a group of virtual ports. In some embodiments, because the gateway device 510 includes a greater number of primary Fibre Channel ports 512a-512e than secondary Fibre Channel ports 514a-514c, each primary Fibre Channel port 512a-512e is not specifically and/or initially associated with a secondary Fibre Channel port 514a-514c.

The Fibre Channel switch 530 includes primary Fibre Channel ports 532a-532e and secondary Fibre Channel ports 534a-534c, similar to the primary Fibre Channel ports 432a-432d and the secondary Fibre Channel ports 434a-434d, shown and described with respect to FIG. 4. The Fibre Channel switch 530 also includes virtual ports 536a-536e, similar to the virtual ports 436a-436d, shown and described with respect to FIG. 4. As shown in FIG. 5, when the interface 500 is in the first configuration, each primary Fibre Channel port 532a-532e is associated with a virtual port 536a-536e. In some embodiments, each secondary primary Fibre Channel port 534a-534c is not associated with a virtual port 536a-536e when the interface 500 is in the first configuration. In some embodiments, because the Fibre Channel switch 530 includes a greater number of primary Fibre Channel ports 532a-532e than secondary Fibre Channel ports 534a-534c, each primary Fibre Channel port 532a-532e is not specifically and/or initially associated with a secondary Fibre Channel port 534a-534c.

Each virtual port 516a-516e is associated with a virtual port 536a-536e. For example, virtual port 516a is configured to send data to and receive data from virtual port 536a. Similarly, virtual ports 516b-516e are configured to send data to and receive data from virtual ports 536b-536e, respectively.

Each primary Fibre Channel port 512a-512e is coupled to a primary Fibre Channel port 532a-532e via a primary data path 520a-520e. For example, primary Fibre Channel port 512a is coupled to the primary Fibre Channel port 532a via the primary data path 520a. Similarly, the primary Fibre Channel ports 512b-512e are coupled to the primary Fibre Channel ports 532b-532e via the primary data paths 520b-520e, respectively. When the interface 500 is in the first configuration, each virtual port 516a-516e can communicate with (i.e., send data to and/or receive data from) its associated virtual port 536a-536e using the primary Fibre Channel ports 512a-512e, the primary data paths 520a-520e and the primary Fibre Channel ports 532a-532e, respectively.

In use, each primary data port 512a-512e of the gateway device 510 can send a login signal to the Fibre Channel switch 530. For example, each primary Fibre Channel port 512a-512e can send a FLOGI signal and/or a FDISC signal to the Fibre Channel switch 530. In some embodiments, such a login signal can also include a parameter that indicates that the primary Fibre Channel port 512a-512e is a primary data port.

In response to receiving the FLOGI signal and/or the FDISC signal, the Fibre Channel switch 530 can provide, to the requesting primary Fibre Channel port 512a-512e, a logical identifier (e.g., a logical World Wide Name (WWN)) of the primary Fibre Channel port 532a-532e on which the login and/or initialization procedure was performed. The gateway device 510 can associate the primary Fibre Channel port 512a-512e with this logical WWN such that when data addressed using this logical WWN is received at the gateway device 510, such data can be sent to the Fibre Channel switch 530 via that primary Fibre Channel port 512a-512e. Additionally, the Fibre Channel switch 530 can assign a logical identifier (e.g., an FCID) to the requesting primary Fibre Channel port 512a-512e. Such an identifier can be sent to the gateway device 510.

Additionally, each secondary data port 514a-514c of the gateway device 510 can send a login signal to the Fibre Channel switch 530. For example, each secondary Fibre Channel port 514a-514c can send a FLOGI signal to the Fibre Channel switch 530. In some embodiments, such a login signal can also include a parameter that indicates that the secondary Fibre Channel port 514a-514c is a secondary data port. In response to receiving the FLOGI signal, the Fibre Channel switch 530 can assign a logical identifier (e.g., an FCID) to the requesting secondary Fibre Channel port 514a-514c. In some embodiments, because the requesting secondary Fibre Channel port 514a-514c is a secondary Fibre Channel port, the Fibre Channel switch 530 does not provide the secondary Fibre Channel port 514a-514c with a logical identifier (e.g., a logical WWN) of the secondary Fibre Channel port 532a-532c on which the login and/or initialization procedure was performed.

Each virtual port 516a-516e of the gateway device 510 can receive data (e.g., data frames, packets and/or cells) from a virtual Fibre Channel N port of a peripheral processing device (not shown in FIG. 5) operatively coupled to the gateway device 510. The virtual port 516a-516e can send the data to its associated virtual port 536a-536e of the Fibre Channel switch 530 via its associated primary Fibre Channel port 512a-512e, a primary data path 520a-520e and an associated primary Fibre Channel port 532a-532e. For example, virtual port 516a can receive a data frame and/or packet from a virtual Fibre Channel N port and send the data frame and/or packet to the virtual port 536a via the primary Fibre Channel port 512a, the primary data path 520a, and the primary Fibre Channel port 532a. Similarly, the virtual port 536a can send a data frame and/or packet to the virtual port 516a via the primary Fibre Channel port 532a, the primary data path 520a, and the primary Fibre Channel port 512a. Similarly, the virtual ports 516b-516e can send data to and/or receive data from their associated virtual ports 536b-536e via the primary Fibre Channel ports 512b-512e, the primary data paths 520b-520e, and the primary Fibre Channel ports 532b-532e, respectively.

If an error is detected at a primary Fibre Channel port 512a-512e, the gateway device 510 can associate the virtual port 516a-516e associated with that primary Fibre Channel port 512a-512e with a secondary Fibre Channel port 514a-514c. For example, FIG. 6 illustrates the interface 500 in a second configuration in which an error was detected at the primary Fibre Channel port 512b. In the second configuration, the virtual port 516b is associated with the secondary port 514a and the virtual port 536b is associated with the secondary port 534a. In such a configuration, the virtual port 516b communicates with the virtual port 536b via the secondary Fibre Channel port 514a, the secondary data path 522a and the secondary Fibre Channel port 534a.

The interface 500 moves from the first configuration to the second configuration when an error is detected at the primary Fibre Channel port 512b. In such an example, after the gateway device 510 detects the error at the primary Fibre Channel port 512b, the gateway device 510 determines with which secondary Fibre Channel port 514a to associate the virtual port 516b. For example, the gateway device 510 determines which secondary Fibre Channel port 514a-514c is free (i.e., is not already associated with a virtual port 516a-516e). The gateway device 510 then defines and sends a control signal to the Fibre Channel switch 530 indicating that the gateway device 510 plans to associate the virtual port 516b with the secondary Fibre Channel port 514a. More specifically, the control plane module and/or portion of the gateway device 510 sends a control signal to the control plane module and/or portion of the Fibre Channel switch 530. Such a control signal can be sent via an out-of-band control plane connection (i.e., within a different data path than the data paths 520a-520e and 522a-522c) or an in-band control plane connection (i.e., within a common data path as the data paths 520a-520e or 522a-522c).

In response to receiving the control plane signal, the Fibre Channel switch 530 can associate the virtual port 536b with the secondary Fibre Channel port 534a, associate the logical identifier associated with the primary Fibre Channel port 512b (e.g., the logical WWN of the Fibre Channel port 534a) with the secondary Fibre Channel port 514a, and send an acknowledgment signal to the gateway device 510. In response to receiving the acknowledgment signal from the Fibre Channel switch 530, the gateway device 510 can associate the virtual port 516b with the secondary Fibre Channel port 514a. After the virtual port 516b is associated with the secondary Fibre Channel port 514a and the virtual port 536b is associated with the secondary Fibre Channel port 534a, the interface 500 is in the second configuration. More specifically, after the virtual port 516b is associated with the secondary Fibre Channel port 514a and the virtual port 536b is associated with the secondary Fibre Channel port 534a, the virtual port 516b can send data to the virtual port 536b via the secondary Fibre Channel port 514a, the secondary data path 522a, and the secondary Fibre Channel port 536b.

Similarly, in some embodiments, if the Fibre Channel switch 530 detects an error at a primary Fibre Channel port 532a-532e, the Fibre Channel switch 530 can send a control plane signal to the gateway device 510 indicating that the Fibre Channel switch 530 intends to associate the virtual port 536a-536e associated with that primary Fibre Channel port 532a-532e with a secondary Fibre Channel port 534a-534c. The gateway device 510 associates a corresponding virtual port 516a-516e with a corresponding secondary Fibre Channel port 514a-514c and sends an acknowledgement signal to the Fibre Channel switch 530. After the Fibre Channel switch 530 receives the acknowledgement signal, the corresponding virtual ports 516a-516e and 536a-536e can communicate via a secondary Fibre Channel port 514a-514c, a secondary data path 522a-522c, and a secondary Fibre Channel port 534a-534c.

As shown in FIGS. 5 and 6, in some embodiments, a gateway device 510 includes fewer secondary Fibre Channel ports 514a-514c than primary Fibre Channel ports 512a-512e. Accordingly, if an error is detected at a greater number of primary Fibre Channel ports 512a-512e than a number of secondary Fibre Channel ports 514a-514c, not all virtual ports 516a-516e can be associated with a secondary Fibre Channel port 514a-514c. More specifically, the logical identifier associated with each primary Fibre Channel port 512a-512e (e.g., the logical WWNs of the Fibre Channel ports 534a-534e) cannot be associated with a secondary Fibre Channel port 514a-514c. For example, if none of the secondary Fibre Channel ports 514a-514c are free (i.e., each secondary Fibre Channel port 514a-514c is already associated with a virtual port 516a-516e), not all of the virtual ports 516a-516e can be associated with a secondary Fibre Channel port 514a-514c.

For example, if an error is detected at four primary Fibre Channel ports 512a-512e, only three of the four logical identifiers associated with the primary Fibre Channel ports 512a-512e can be associated with a secondary Fibre Channel port 514a-514c. Accordingly, only three of the four associated virtual ports 516a-516e (or associated port groupings) can be associated with a secondary Fibre Channel port 514a-514c. In such embodiments, the gateway device 510 can determine which virtual ports 516a-516e to associate with and/or assign to a secondary Fibre Channel port 514a-514c using any suitable criteria. In some embodiments, for example, each virtual port 516a-516e (or virtual port group) is assigned a priority indicator. In such embodiments, the virtual ports 516a-516e having the highest priority indicator can be associated with and/or assigned to a secondary Fibre Channel port 514a-514c. Similarly stated, the virtual port 516a-516e having the lowest priority indicator is not assigned to and/or associated with a secondary Fibre Channel port 514a-514c. Moreover, in such embodiments, if a low priority virtual port 516a-516e is already associated with a secondary Fibre Channel port 514a-514c when a primary Fibre Channel port 512a-512e associated with a high priority virtual port 516a-516e fails, the low priority virtual port 516a-516e can be disassociated from the secondary Fibre Channel port 514a-514c to provide a secondary Fibre Channel port 514a-514c with which the high priority virtual port 516a-516e can be associated.

In other embodiments, the virtual ports 516a-516e are associated with and/or assigned to a secondary Fibre Channel port 514a-514c based on a time at which an error was detected at an associated primary Fibre Channel port 512a-512e. In such embodiments, the virtual port 516a-516e associated with the primary Fibre Channel port 512a-512e that fails first, is given the highest priority for a secondary Fibre Channel port 514a-514c. Accordingly, in such embodiments, if every secondary Fibre Channel port 514a-514c is already associated with a virtual port 516a-516e when another primary Fibre Channel port 512a-512e fails, the associated virtual port 516a-516e is not associated with a secondary Fibre Channel port 514a-514c. In other embodiments, any other scheme and/or algorithm can be used to determine the priority of the virtual ports 516a-516e.

FIG. 7 is a flow chart illustrating a method 600 of associating a set of virtual ports with a secondary port upon failure of a primary port, according to another embodiment. The method 600 includes sending a fabric login signal associated with a first port of a gateway device to a Fibre Channel switch prior to a first time period, at 602. The first port is associated with a set of virtual ports. The fabric login signal can include a FLOGI request, an FDISC request and/or any other initialization and/or login request. In some embodiments, the Fibre Channel switch can provide a logical identifier and/or any other suitable identifier to the first port in response to receiving the fabric login signal.

An identifier associated with the first port in response to the fabric login signal is received, prior to the first time period, from the Fibre Channel switch, at 604, and data packets addressed using the identifier are sent, during the first time period, to the Fibre Channel switch via the first port, at 606.

The set of virtual ports are associated with a second port before a second time period, after the first time period, and in response to an error at the first port, at 608, and the identifier is associated, before the second time period, with the second port, at 610. In some embodiments, the identifier is associated with the second port prior to the first time period. In other embodiments, the identifier is associated with the second port after an error is detected at the first port.

Data packets addressed using the identifier are sent, during the second time period, to the Fibre Channel switch via the second port, at 612. Accordingly, the second port provides a backup port for the first port.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, a gateway device (e.g., gateway device 510 shown and described with respect to FIGS. 5 and 6) having fewer secondary Fibre Channel ports than primary Fibre Channel ports can initially associate some of the primary Fibre Channel ports with a secondary Fibre Channel port. Accordingly, the secondary Fibre Channel ports are assigned a logical identifier associated with their associated primary Fibre Channel port (e.g., the same logical WWN of a port of a Fibre Channel switch). In such embodiments, other primary Fibre Channel ports will not be associated with a secondary Fibre Channel port. If a primary Fibre Channel port associated with a secondary Fibre Channel port fails, a virtual port associated with that primary Fibre Channel port can be associated with the associated secondary Fibre Channel port and data can be sent via the secondary Fibre Channel port, similar to that shown and described with respect to interface 400 of FIG. 4. Thus, data can be sent via the secondary Fibre Channel port prior to sending a control signal to the Fibre Channel switch. If however, a primary Fibre Channel port not associated with a secondary Fibre Channel port fails, a logical identifier associated with that primary Fibre Channel port is associated with a secondary Fibre Channel port (e.g., by the gateway device and the Fibre Channel switch exchanging control signals) prior to sending data via the secondary Fibre Channel port. Accordingly, a control signal is sent to the Fibre Channel switch prior to the gateway device associating a virtual port associated with that primary Fibre Channel port with the secondary Fibre Channel port. The control signal can be configured to cause the Fibre Channel switch to disassociate the primary Fibre Channel port initially associated with the secondary Fibre Channel port, and to associate a logical identifier associated with the failed primary Fibre Channel port with the secondary Fibre Channel port.

In some embodiments, a gateway device (e.g., gateway device 410 shown and described with respect to FIG. 4) having a same number of primary ports and secondary ports can function similar to a gateway device (e.g., gateway device 510 shown and described with respect to FIGS. 5 and 6) having fewer number of secondary ports than primary ports when a secondary port fails. After a secondary port fails, a gateway device that includes a same number of primary ports and secondary ports, can subsequently function as a gateway device that includes fewer secondary ports than primary ports. More specifically, because the gateway device includes fewer operational secondary Fibre Channel ports than primary Fibre Channel ports after the failure of a secondary port, the gateway device functions similar to the gateway device 510.

In some embodiments, a gateway device (e.g., gateway device 510 shown and described with respect to FIGS. 5 and 6) having fewer secondary Fibre Channel ports than primary Fibre Channel ports can initially assign multiple primary Fibre Channel ports to one secondary Fibre Channel port. More specifically, the gateway device can designate a secondary Fibre Channel port as the backup port for multiple primary Fibre Channel ports. In some embodiments, the secondary Fibre Channel port assigned to the multiple primary Fibre Channel ports is not, however, assigned the logical identifier of any of the multiple primary Fibre Channel ports with which it is associated. In other embodiments, the secondary Fibre Channel port assigned to the multiple primary Fibre Channel ports is assigned a logical identifier of one of the primary Fibre Channel ports from the multiple primary Fibre Channel ports with which it is associated.

When one of the multiple primary Fibre Channel ports assigned to the secondary Fibre Channel port fails, the virtual ports associated with the failed primary Fibre Channel port is associated with the secondary Fibre Channel port. More specifically, the secondary Fibre Channel port is assigned the logical identifier associated with the failed primary Fibre Channel port (e.g., using control signals sent between the gateway device and the Fibre Channel switch). If another primary Fibre Channel port assigned to the same secondary Fibre Channel port fails, the gateway device can use any suitable priority based method (e.g., priority indicators, first in time, etc.) to determine which primary Fibre Channel port to backup using the secondary Fibre Channel port. In some embodiments, the gateway device can include multiple groupings of primary Fibre Channel ports with each grouping having a designated secondary Fibre Channel port.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a gateway device configured to be operatively coupled to a Fibre Channel switch by a first data port and a second data port, the gateway device configured to designate the first data port as a primary data port and the second data port as a secondary data port, the gateway device configured to associate a plurality of virtual ports with the first data port and not the second data port when the gateway device is in a first configuration, the gateway device configured to communicate with the Fibre Channel switch via the first data port and not via the second data port when the gateway device is in the first configuration,
the gateway device configured to associate the plurality of virtual ports with the second data port when the gateway device is in a second configuration, the gateway device configured to communicate with the Fibre Channel switch via the second data port when the gateway device is in the second configuration,
the gateway device moving, without sending a fabric login signal prior to a second time period after a first time period, from the first configuration to the second configuration when an error associated with the first data port is detected,
the gateway device includes a control plane portion configured to send a reconfigure signal to a control plane portion of the Fibre Channel switch subsequent to the gateway device moving from the first configuration to the second configuration.

2. The apparatus of claim 1, wherein the gateway device is a Fibre Channel to Fibre Channel Over Ethernet gateway.

3. The apparatus of claim 1, wherein the gateway device is configured to operatively couple the Fibre Channel switch to an Ethernet network.

4. The apparatus of claim 1, wherein the gateway device is configured to receive, from the Fibre Channel switch, a common logical identifier to associate with the first data port and the second data port.

5. The apparatus of claim 1, wherein the plurality of virtual ports is a first plurality of virtual ports, the gateway device configured to associate a second plurality of virtual ports with a third data port when the gateway device is in the first configuration or the second configuration, the gateway device configured to associate the second plurality of virtual ports with the second data port when the gateway device is in a third configuration, the gateway device configured to disassociate the first plurality of virtual ports from the second data port when the gateway device is moved from the second configuration to the third configuration.

6. The apparatus of claim 1, wherein the gateway device is configured to send to the Fibre Channel switch a first fabric login signal indicating that the first data port is the primary data port, the gateway device configured to send to the Fibre Channel switch a second fabric login signal indicating that the second data port is the secondary data port.

7. The apparatus of claim 1, wherein the gateway device is configured to send a fabric discovery signal to the Fibre Channel switch for the first data port but not the second data port when the gateway device is in the first configuration.

8. An apparatus, comprising:
a gateway device configured to be operatively coupled to a Fibre Channel switch by a plurality of primary data ports and a secondary data port, the gateway device configured to receive, from the Fibre Channel switch, an identifier for each primary data port from the plurality of primary data ports, the gateway device configured to associate a virtual port from a plurality of virtual ports with each primary data port from the plurality of primary data ports but not the secondary data port when the gateway device is in a first configuration, the gateway device configured to communicate with the Fibre Channel switch via the plurality of primary data ports and not via the secondary data port when the gateway device is in the first configuration,
the gateway device configured to associate the virtual port associated with a primary data port from the plurality of primary data ports when the gateway device is in the first configuration with the secondary data port when the gateway device is in a second configuration, the gateway device configured to associate the identifier for the primary data port from the plurality of primary data ports with the secondary data port when the gateway device is in the second configuration, the gateway device moving, without sending a fabric login signal prior to a second time period after a first time period, from the first configuration to the second configuration when an error associated with the primary data port from the plurality of primary data ports is detected.

9. The apparatus of claim 8, wherein the gateway device is configured to not receive an identifier for the secondary data port when the gateway device is in the first configuration.

10. The apparatus of claim 8, wherein the gateway device is configured to receive the identifier for each primary data port from the plurality of primary data ports as a result of the gateway device sending to the Fibre Channel switch a fabric login signal prior to the first time period for each primary data port from the plurality of primary data ports, the fabric login signal for each primary data port from the plurality of primary data ports including an indication that that primary data port is a primary data port.

11. The apparatus of claim 8, wherein the gateway device is configured to operatively couple the Fibre Channel switch to an Ethernet network.

12. The apparatus of claim 8, wherein the gateway device is configured to send a fabric discovery signal to the Fibre Channel switch for each primary data port from the plurality of primary data ports but not the secondary data port when the gateway device is in the first configuration.

13. The apparatus of claim 8, wherein the primary data port from the plurality of primary data ports is a first primary data port from the plurality of primary data ports, the gateway device configured to detect an error associated with a second primary data port from the plurality of primary data ports when the gateway device is in the second configuration, the virtual port associated with the second primary data port when the gateway device is in the first configuration not being associated with the secondary data port when the gateway device is in the second configuration,
a priority identifier of the virtual port associated with the first primary data port when the gateway device is in the first configuration being different than a priority identifier of the virtual port associated with the second primary data port when the gateway device is in the first configuration.

14. A non-transitory processor-readable medium storing code representing instructions to cause a processor to:
receive, at a gateway device and from a Fibre Channel switch, an identifier for a primary data port operatively coupling the gateway device with the Fibre Channel switch;
associate, in response to receiving the identifier for the primary data port, a plurality of virtual ports with the primary data port such that the gateway device sends data to the Fibre Channel switch prior to a time via the primary data port and not via a secondary data port operatively coupling the gateway device with the Fibre Channel switch;
detect, at the time, an error in the primary data port;
associate the plurality of virtual ports with the secondary data port in response to the indication of the error; and
associate, without sending a fabric login signal before a second time period after a first time period, the identifier for the primary data port with the secondary data port after the time.

15. The non-transitory processor-readable medium of claim 14, wherein the gateway device operatively couples the Fibre Channel switch to an Ethernet network.

16. The non-transitory processor-readable medium of claim 14, further comprising code to cause the processor to:
send a fabric discovery signal to the Fibre Channel switch for the primary data port but not the secondary data port before the time.

17. The non-transitory processor-readable medium of claim 14, wherein the code to cause the processor to associate the identifier for the primary data port with the secondary data port includes code to associate the identifier for the primary data port with the secondary data port such that the gateway device sends data to the Fibre Channel switch after the time via the secondary data port and not via a primary data port.

* * * * *